P. GRIFFITH.
Parlor Hot House.
No. 100,287. Patented March 1, 1870.
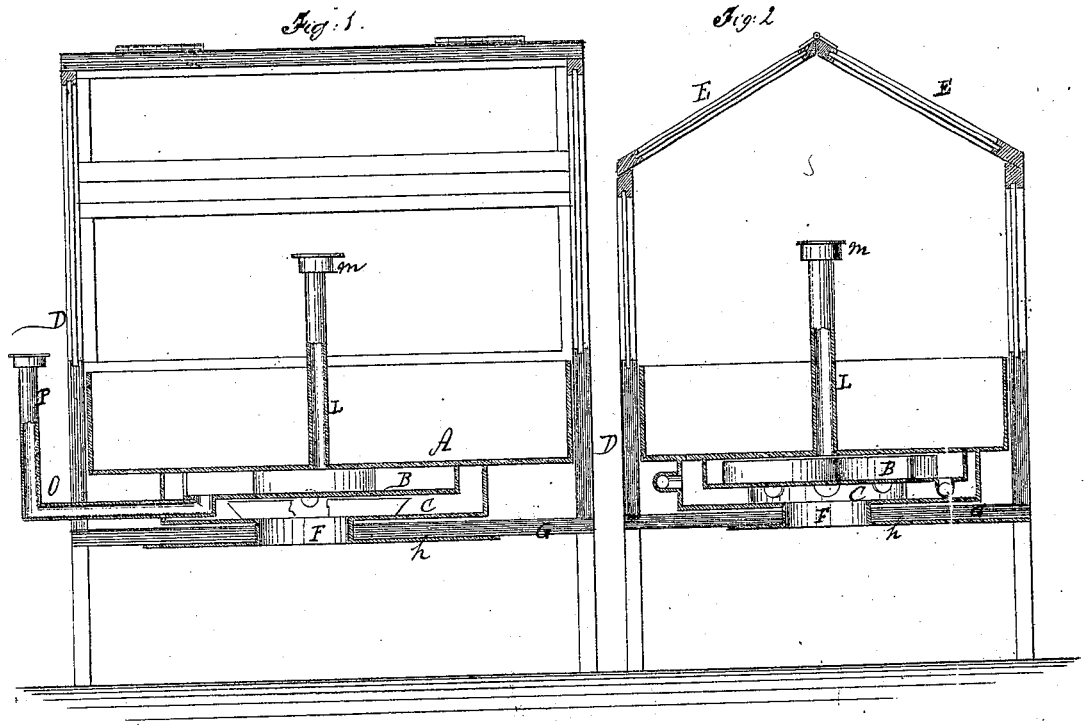
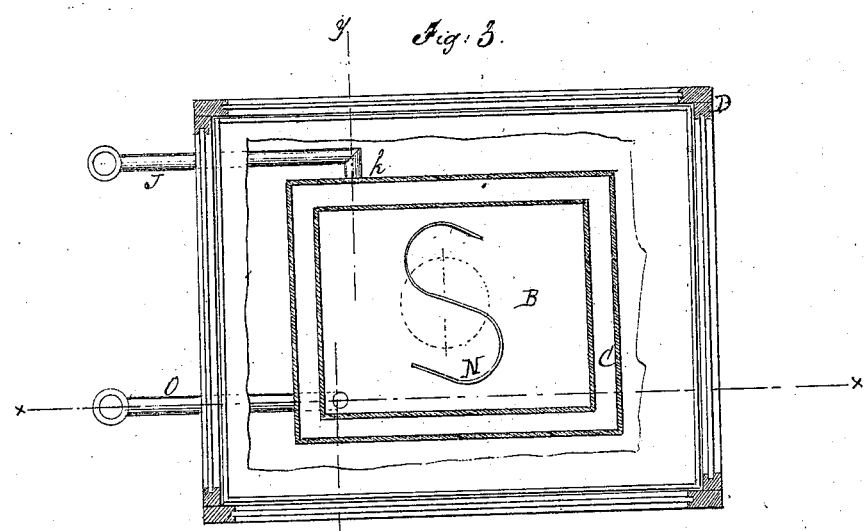
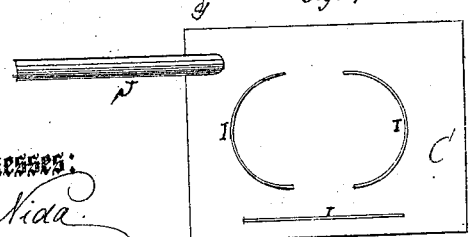
Witnesses:
Chas. Nida
Mo. F. Brooks
Inventor:
P. Griffith
Per Wmm & Co
Attorneys.

United States Patent Office.

PATRICK GRIFFITH, OF BROOKLYN, NEW YORK.

Letters Patent No. 100,287, dated March 1, 1870.

IMPROVEMENT IN PARLOR HOT-HOUSE.

The Schedule referred to in these Letters Patent and making part of the same.

To all whom it may concern:

Be it known that I, PATRICK GRIFFITH, of Brooklin, in the county of Kings, and State of New York, have invented a new and useful Improvement in Parlor Hot-Houses; and I do hereby declare that the following is a full, clear, and exact description thereof, which will enable others skilled in the art to make and use the same, reference being had to the accompanying drawings forming part of this specification.

This invention relates to a new and useful improvement in apparatus for propagating and growing plants, cultivating flowers, and for preserving them in cold weather, and consists in the construction and arrangement hereinafter described.

In the accompanying drawings—

Figure 1 is a vertical section through the line x x of fig. 3.

Figure 2 is a vertical section of fig. 3 through the line y y.

Figure 3 is a top view of the water-chamber.

Figure 4 is a view of the under side of the top plate of the heating-chamber.

Similar letters of reference indicate corresponding parts.

This apparatus is more especially designed for growing flowers and choice plants in dwellings in cold weather, and it may be designed and finished to adapt it to the parlor or any other apartment.

It consists of a water-tight pan, A, with a water-chamber, B, and a heating-chamber, C, beneath the bottom of the pan, the whole being supported by a suitable frame, with or without glass sides and top or roof.

D represents the frame.

E, the top or roof.

The frame may be in any form and glazed or not. The frame need not necessarily extend above the top of the pan A, but by forming it so as to close up the plants, the cold air will be excluded and the apparatus better adapted for out-door use.

F is an aperture in the bottom, beneath which a lighted lamp is placed. This aperture, with the bottam G of the frame, is secured by metallic lining to protect it from fire, as seen at h. The upper sheet or plate of the heating-chamber is seen in fig. 3.

I represents deflectors arranged on that plate for the purpose of insuring a proper distribution of heat.

J is the exit-pipe for the smoke or gases evolved from the flame of the lamp. This pipe connects with the heating-chamber at the point k. The deflectors I serve to support the weight which presses downward from the pan A.

The water-chamber B is directly beneath the bottom of the pan A and over the heating-chamber C.

L is a tube which connects with this chamber. It is provided with a cap, m, which screws on, and which is removed for the escape of the air when the chamber is filled. The water-chamber B is a pan attached water-tight to the bottom of the pan A.

N (on the bottom of this chamber) is for the purpose of supporting the weight above and preventing the crushing down of the bottom of the pan A.

This chamber is filled with water by means of the tube O, the elevated portion P of which is made adjustable, so that it may be turned down for drawing off the water at any time.

The flame of a lamp will heat the water, by which heat will be conveyed to the contents of the pan A.

By this arrangement plants may be kept fresh and blooming at all seasons of the year at a very slight expense. Sufficient warmth at certain seasons may be imparted by simply filling the water-chamber with hot water through the tube O P occasionally, but the use of a lamp is preferred, especially in cold weather.

Having thus described my invention,

I claim as new, and desire to secure by Letters Patent—

1. A hot-house formed of the pan A, water-chamber B, heating-chamber C, the metal-lined bottom G with aperture F therein, deflectors I, and pipes J O L, all constructed and arranged as and for the purpose specified.

2. A plant receptacle A for a hot-house, having the vertical tube L with the removable cap m thereon, as and for the purpose specified.

3. The water-heating device consisting of the deflectors I, chamber C, and aperture F, the flame of a lamp being applied to the latter, in the manner set forth.

4. A water-chamber B for hot-houses, provided with an adjustable pipe, O, which serves both for an inlet and outlet for the water, as set forth.

PATRICK GRIFFITH.

Witnesses:
GEO. W. MABEE,
ALEX. F. ROBERTS.